United States Patent
Wang et al.

(10) Patent No.: US 11,055,903 B2
(45) Date of Patent: Jul. 6, 2021

(54) ANTI-ALIASING GRAPHIC PROCESSING METHOD, SYSTEM, STORAGE MEDIUM AND APPARATUS

(71) Applicants: VeriSilicon Microelectronics (Shanghai) Co., Ltd., Shanghai (CN); VeriSilicon Holdings Co., Ltd., Cayman Islands (GB)

(72) Inventors: Ping Wang, Shanghai (CN); Yongjun Chen, Shanghai (CN); Huiming Zhang, Shanghai (CN); Mike Cai, Shanghai (CN)

(73) Assignees: VeriSilicon Microelectronics (Shanghai) Co., Ltd., Shanghai (CN); VeriSilicon Holdings Co., Ltd., Grand Cayman (KY)

( * ) Notice: Subject to any disclaimer, the term of this patent is extended or adjusted under 35 U.S.C. 154(b) by 0 days.

(21) Appl. No.: 16/683,264

(22) Filed: Feb. 10, 2020

(65) Prior Publication Data
US 2020/0160592 A1 May 21, 2020

(51) Int. Cl.
- *G06T 5/00* (2006.01)
- *G06T 15/40* (2011.01)
- *G06T 15/04* (2011.01)

(52) U.S. Cl.
CPC .............. *G06T 15/40* (2013.01); *G06T 5/002* (2013.01); *G06T 15/04* (2013.01)

(58) Field of Classification Search
CPC .................................................... G06T 15/503
See application file for complete search history.

(56) References Cited

U.S. PATENT DOCUMENTS

| | | | | |
|---|---|---|---|---|
| 2007/0097140 A1* | 5/2007 | Fenney | G06T 5/002 | 345/581 |
| 2013/0141445 A1* | 6/2013 | Engh-halstvedt | G06T 15/503 | 345/506 |
| 2013/0187917 A1* | 7/2013 | Foo | G06T 15/005 | 345/420 |
| 2015/0049110 A1* | 2/2015 | Lum | G06T 15/503 | 345/600 |
| 2016/0035129 A1* | 2/2016 | Bolz | G06T 15/80 | 345/420 |
| 2017/0206638 A1* | 7/2017 | Fainstain | G06T 19/20 | |
| 2017/0345120 A1* | 11/2017 | Seiler | G06T 1/60 | |
| 2019/0188896 A1* | 6/2019 | Heggelund | G06T 15/005 | |

* cited by examiner

*Primary Examiner* — Phi Hoang

(57) ABSTRACT

The present disclosure provides an edge anti-aliasing graphic processing method, system, storage medium and apparatus. The method includes: obtaining four sampling points by double sampling a pixel horizontally and vertically and performing rasterization to the pixel, determining whether the four sampling points are covered by a triangle; performing a depth value test on the pixel, and determining whether the four sampling points of the pixel are all covered by the triangle; performing final color processing on the pixel, determining whether the four sampling points are covered by the triangle, if the four sampling points are all covered by the triangle, copying a color of the pixel center point to the four sampling points, if not all the four sampling points are covered by the triangle, mixing colors of the four sampling points of the pixel.

11 Claims, 3 Drawing Sheets

Obtaining four sampling points by double sampling a pixel horizontally and vertically and performing rasterization to the pixel, determining whether the four sampling points are covered by a triangle; if the four sampling points are all covered by the triangle, calculating a depth value of a pixel center point, copying the depth value of the pixel center point to the four sampling points, and setting a pixel flag bit of the pixel as a first value; if not all the four sampling points are covered by the triangle, calculating depth values of the four sampling points, and setting a pixel flag bit of the pixel as a second value Performing a depth value test on the pixel, and determining whether the four sampling points of the pixel are all covered by the triangle; if the four sampling points are all covered by the triangle, comparing center depth values of the pixel according to a first preset rule, and replacing the depth values of the four sampling points with the compared center depth values; if not all the four sampling points are covered by the triangle, comparing the depth value of each sampling point according to a second preset rule, storing the depth values of the compared four sampling points to a buffer, and finally writing to an external memory Performing final color processing on the pixel, determining whether the four sampling points are all covered by the triangle; if the four sampling points are all covered by the triangle, copying a color of the pixel center point to the four sampling points;
if not all the four sampling points are covered by the triangle, mixing colors of the four sampling points of the pixel

FIG. 1

Edge anti-aliasing graphic processing system

| 21 | 22 | 23 |
|---|---|---|
| Depth calculation module | Depth value test module | Pixel processing module |

FIG. 2

ANTI-ALIASING GRAPHIC PROCESSING METHOD, SYSTEM, STORAGE MEDIUM AND APPARATUS

CROSS REFERENCE TO RELATED APPLICATION

The present application is related to and claims the benefit of priority to Chinese Patent Application No. 201811354719X, entitled "Edge Anti-Aliasing Graphic Processing Method, System, Storage Medium and Apparatus", filed with SIPO on Nov. 14, 2018, the contents of which are incorporated herein by reference in its entirety.

BACKGROUND

Field of Disclosure

The present disclosure relates to the technical field of image processing, in particular, to an edge anti-aliasing graphic processing method, system, storage medium and apparatus.

Description of Related Arts

In 3D graphic, each region consists of pixels, each segment consists of frames. Due to technical limitations, we do not have enough samples to represent all the objects in the 3D world. Thus distortion such as aliasing and flickering will occur at the edge of the transition, which seriously affects the quality of the picture.

In the traditional 3D graphic processor, the pixels at the edge of the triangle have an aliasing effect due to the resolution of the pixel itself. In order to eliminate the aliasing effect, the traditional Multi Sampling Anti-Aliasing (MSAA) algorithm increases the sampling rate for each pixel. When a pixel has only a portion of the sampled points within the current triangle, the contribution of the current triangle to the color of the pixel is proportional to the coverage rate of the sampling points. Thus the color at the boundary of the triangle is the color of the proportional blending of the pixel colors of the adjacent triangles, thereby eliminating the aliasing effect at the edge of the triangle. The multi sampling uses multiple sampling points to determine the coverage scope of the triangle, rather than a single sampling point. Instead of the sampling point at the center of each pixel, 4 subsamples are used to determine the coverage rate of the pixel. This means that the size of the color buffer is increased by the increase in the number of subsamples per pixel. The disadvantage of this method is that each pixel is sampled 4 times for 4× sampled pixel anti-aliasing. Therefore, many processing units in the graphic processor need to read or write 4 times of data from the external memory, and also require 4 times the processing capacity in the pipeline operation. For embedded graphic processors, external memory access bandwidth is usually limited. 4 times the read and write bandwidth will make storage access a bottleneck in graphic processor performance, thus reducing the performance of the graphic processor. At the same time, four times the operation in the pipeline also reduces the throughput rate of the graphic processor and increases the power consumption.

The drawing of each pixel is determined by whether the pixel is completely inside the polygon. The pixel is rendered if it is inside a polygon. Otherwise it will not be rendered. Obviously, this is not accurate. Some pixels are just at the edge. If we determine the rendering of a pixel based on the size of the area inside the polygon, then the achieved effect is much better. The color of the final pixel is a mixture of the color of the polygon and the color of its exterior. You might think that this would result in performance consumption, actually it is. But we may use multiple samples for each pixel to approximate the final result.

The multi sampling anti-aliasing algorithm includes performing multiple samples for each pixel and then blending the results of these samples to determine the final value of the pixel. The sampling points are located at different locations inside the pixel. Obviously, most of the sampling points will be inside the polygon. But for those pixels at the edge of the polygon, some of the sampling points will be outside the polygon. If each pixel is sampled for 4 times, the frequency of rasterization will be 4 times that without multi sampling. For each pixel, the fragment shader is executed once and the output result is determined by the number of sampling points located inside the polygon.

Fast Sample Anti-Alias (FSAA) algorithm saves system bandwidth and processing overhead. However, since the image is not really sampled, but is scaled by the filter, the anti-aliasing effect is not ideal. Especially in the case that the edges of various objects are staggered, it is easy to cause image quality problems and positional deviation of the object.

The performance of the graphic processor is reduced due to the increase of the 3D graphic processor chip memory read and write bandwidth and the pixel processing capacity.

SUMMARY OF THE PRESENT DISCLOSURE

The present disclosure provides an edge anti-aliasing graphic processing method, system, storage medium and apparatus, to solve the problem that most pixels require four times of depth value calculation and test and color processing, which reduces the processing efficiency.

The present disclosure provides an edge anti-aliasing graphic processing method, including: obtaining four sampling points by double sampling a pixel horizontally and vertically and performing rasterization to the pixel, determining whether the four sampling points are covered by a triangle; if the four sampling points are all covered by the triangle, calculating a depth value of a pixel center point, copying the depth value of the pixel center point to the four sampling points, and setting a pixel flag bit of the pixel as a first value; if not all the four sampling points are covered by the triangle, calculating depth values of the four sampling points, and setting a pixel flag bit of the pixel as a second value; when performing a depth value test on the pixel, need determining whether the four sampling points of the pixel are covered by the triangle; if the four sampling points are all covered by the triangle, comparing center depth values of the pixel according to a first preset rule, and replacing the depth values of the four sampling points with the compared center depth values; if not all the four sampling points are covered by the triangle, comparing the depth value of each sampling point according to a second preset rule, storing the depth values of the compared four sampling points to a buffer, and finally writing to an external memory; when performing final color processing on the pixel, need determining whether the four sampling points are all covered by the triangle, if the four sampling points are all covered by the triangle, copying a color of the pixel center point to the four sampling points, if not all the four sampling points are covered by the triangle, mixing colors of the covered sampling points of the pixel.

In an embodiment of the present disclosure, after performing the depth value test on the pixel, the method further includes: performing color calculation on the pixel, and performing programmable coloring processing on the pixel.

In an embodiment of the present disclosure, the method further includes: converting data into a format corresponding to a display and transmitting to an external memory.

In an embodiment of the present disclosure, before performing final color processing on the pixel, the method further includes: performing texture mapping.

In an embodiment of the present disclosure, before performing final color processing on the pixel, the method further includes: performing the depth value test on the pixel, determining whether the four sampling points are covered by the triangle, if the four sampling points are covered by the triangle, comparing center depth values of the pixel according to a first preset rule, and replacing the depth values of the four sampling points with the compared center depth values, if not all the four sampling points are covered by the triangle, comparing the depth value of each sampling point according to a second preset rule, storing the depth values of the compared four sampling points to a buffer, and finally writing to an external memory.

In an embodiment of the present disclosure, when performing the depth value test, if the depth value is not stored in the buffer, reading data from the external memory, if the pixel flag bits of the pixels contained in a pixel block are all the first value, decompressing the pixel block and returning data of 64B or 32B according to a number of bits of the pixel block, and expanding the data into 256B or 128B to store the data to the buffer; if the pixel flag bits of the pixels contained in a pixel block are not all the first value, decompressing the pixel block and returning data of 256B or 128B according to the number of the bits of the pixel block.

In an embodiment of the present disclosure, the state of the pixel block is represented by a hexadecimal digit; 0 represents that compression of 4 times sample pixel fails; 1 represents a clear value of the 4 times sample pixel; 2, 4, 6, 8, 0xA, 0xC, and 0xE represent 7 compression results of the 4 times sample pixel, 3 represents a compression result of a double pixel of 32B, 5 represents that compression of the pixel fails, and 0xF represents a clear value of the pixel.

The present disclosure further provides an edge anti-aliasing graphic processing system, including: a depth calculation module, a depth value test module, and a pixel processing module; the depth calculation module is configured to obtain four sampling points by double sampling a pixel horizontally and vertically and performing rasterization to the pixel, and determine whether the four sampling points are covered by a triangle; if the four sampling points are covered by the triangle, calculating a depth value of a pixel center point, copying the depth value of the pixel center point to the four sampling points, and setting a pixel flag bit of the pixel as a first value; if not all the four sampling points are covered by the triangle, calculating depth values of the four sampling points, and setting a pixel flag bit of the pixel as a second value; the depth value test module is configured to perform a depth value test on the pixel, and determine whether the four sampling points of the pixel are covered by the triangle; if the four sampling points are covered by the triangle, comparing center depth values of the pixel according to a first preset rule, and replacing the depth values of the four sampling points with the compared center depth values; if not all the four sampling points are covered by the triangle, comparing the depth value of each sampling point according to a second preset rule, storing the depth values of the compared four sampling points to a buffer; the pixel processing module is configured to perform final color processing on the pixel, and determine whether the four sampling points are completely covered by the triangle, if the four sampling points are covered by the triangle, copying a color of the pixel center point to the four sampling points, if not all the four sampling points are covered by the triangle, mixing colors of the covered sampling points of the pixel.

In an embodiment of the present disclosure, the system further includes: a color calculation module, a programmable coloring processing module, a display format conversion module, and a storage access control module; the color calculation module is configured to perform color calculation on the pixel; the programmable coloring processing module is configured to perform programmable coloring processing on the pixel; the display format conversion module is configured to convert data into a format corresponding to a display; the storage access control module is configured to cache the depth value and finally store to an external memory.

The present disclosure further provides a computer readable storage medium, which stores a computer program, the program is executed by a processor to implement the above edge anti-aliasing graphic processing method.

The present disclosure further provides an edge anti-aliasing graphic processing apparatus, including: a processor and a memory; the memory is configured to store a computer program; the processor is coupled with the memory, for executing the computer program stored by the memory, to cause the edge anti-aliasing graphic processing apparatus to perform the above edge anti-aliasing graphic processing method.

As described above, the edge anti-aliasing graphic processing method, system, storage medium and apparatus of the present disclosure have the following beneficial effects: the bandwidth of graphic processing to read externally stored data is saved. For most of the pixels, calculation and test of the depth value, and processing of the attributes such as color once are required only for once, which greatly reduces the amount of data that needs to be processed.

BRIEF DESCRIPTION OF THE DRAWINGS

FIG. 1 is a flow chart of an edge anti-aliasing graphic processing method according to an embodiment of the present disclosure;

FIG. 2 is a schematic view showing an edge anti-aliasing graphic processing system according to a first embodiment of the present disclosure;

DESCRIPTION OF REFERENCE NUMERALS

Figure 3:
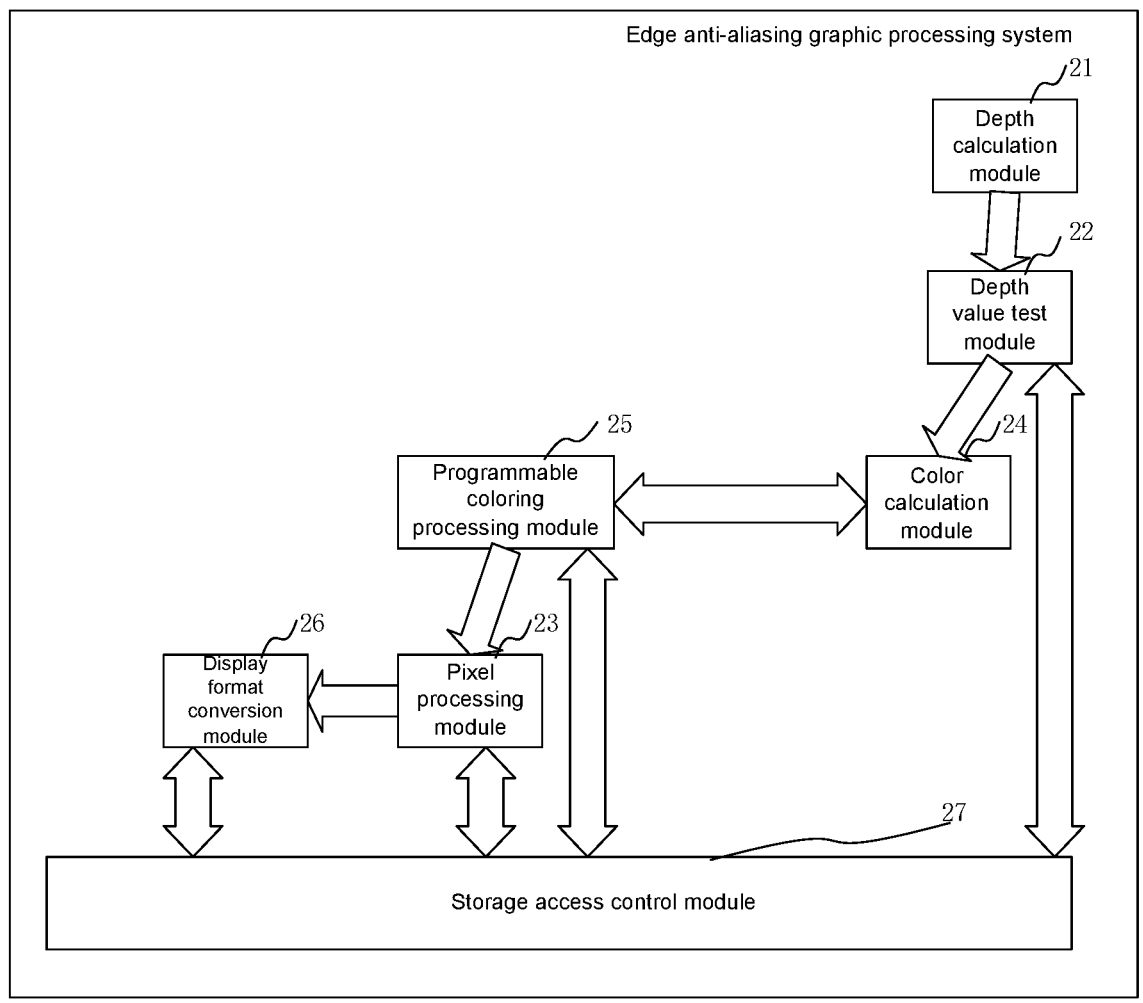
FIG. 3 is a schematic view showing the edge anti-aliasing graphic processing system according to a second embodiment of the present disclosure.

21 Depth calculation module
22 Depth value test module
23 Pixel processing module
24 Color calculation module
25 Programmable coloring processing module
26 Display format conversion module 27 Storage access control module
28 Command and vertex processing module
29 Rasterization module
30 Texture mapping module
51 Processor
52 Memory

DETAILED DESCRIPTION OF THE PREFERRED EMBODIMENTS

The embodiments of the present disclosure will be described below. Those skilled in the art can easily understand other advantages and effects of the present disclosure according to contents disclosed by the specification. The present disclosure can also be implemented or applied through other different specific implementation modes. Various modifications or changes can also be made to all details in the specification based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complicated.

The edge anti-aliasing graphic processing method, system, storage medium and apparatus of the present disclosure are based on determining whether the four sampling points of the pixel are covered by the triangle. The present disclosure saves the bandwidth of the graphic processing to read the externally stored data, most of the pixels only need to calculate and test the depth value and process the attributes such as color once. The amount of data that needs to be processed is greatly reduced. It may reduce pixel processing by 15% to 50% while reducing bandwidth consumption by 20% to 50%. The present disclosure may work in conjunction with the compression algorithm of the graphic processor to further save system bandwidth.

As shown in FIG. 1, in an embodiment, the edge anti-aliasing graphic processing method of the present disclosure includes the following operations:

Operation 11: obtaining four sampling points by double sampling a pixel horizontally and vertically and performing rasterization to the pixel, determining whether the four sampling points are covered by a triangle. If the four sampling points are all covered by the triangle, calculating a depth value of a pixel center point, copying the depth value of the pixel center point to the four sampling points, and setting a pixel flag bit of the pixel as a first value. If not all of the four sampling points are covered by the triangle, calculating depth values of the four sampling points, and setting a pixel flag bit of the pixel as a second value.

In an embodiment of the present disclosure, the pixel is double sampled in the horizontal and vertical directions simultaneously. The rasterization is a process in which the geometric data is transformed into a pixel after a series of transformations, thereby presenting on the display apparatus. The essence of rasterization is coordinate transformation and geometric discretization. Four sampling points are obtained by double sampling the pixel horizontally and vertically and performing rasterization to the pixel, then determine whether the four sampling points obtained by sampling the same pixel are covered by the same triangle. If the four sampling points are all covered by the triangle, calculating a depth value of a pixel center point, and copying the depth value of the pixel center point to the four sampling points. The depth value of the pixel center point is a depth value at a physical center point position of the pixel. The pixel has a pixel flag bit. When the four sampling points are all covered by the triangle, a value of the pixel flag bit is a first value. Specifically, the first value is 1. If not all of the four sampling points are covered by the triangle, calculating depth values of the four sampling points respectively. The pixel flag bit of the pixel has a second value. Specifically, the second value is zero.

Operation 12: performing a depth value test on the pixel, and determining whether the four sampling points of the pixel are covered by the triangle. If the four sampling points are all covered by the triangle, comparing center depth values of the pixel according to a first preset rule, and replacing the depth values of the four sampling points with the compared center depth values; if not all of the four sampling points are covered by the triangle, comparing the depth value of each sampling point according to a second preset rule, storing the depth values of the compared four sampling points to a buffer, and finally writing to an external memory.

In an embodiment of the present disclosure, a depth value test is performed on the pixel. If the four sampling points are all covered by the triangle and the value of the pixel flag bit of the pixel is the first value, the center depth values of the pixel is compared. If the comparison is passed, the depth values of the four sampling points are replaced with the compared center depth values. If not all of the four sampling points are not covered by the triangle or the value of the pixel flag bit of the pixel is the second value, the depth value of each sampling point is compared. If the comparison is passed, the depth values of the compared four sampling points are stored to a buffer and finally written to an external memory.

In an embodiment of the present disclosure, a read request for the depth value is sent to the buffer. If the depth value has already been in the buffer, the depth value is sent to the subsequent pipeline for depth value comparison, otherwise the data read request of 256B/128B is sent to the storage access control unit. The storage access control unit first checks the status of the corresponding pixel block (buffer line). The pixel block includes a plurality of pixels.

In an embodiment of the present disclosure, the state of the pixel block is represented by a hexadecimal digit. 0 represents that compression of 4 times sample pixel fails; 1 represents a clear value of the 4 times sample pixel; 2, 4, 6, 8, 0xA, 0xC, and 0xE represent 7 compression results of the 4 times sample pixel, 3 represents a compression result of a pixel of 32B, 5 represents that compression of the pixel fails, and 0xF represents a clear value of the pixel.

In an embodiment of the present disclosure, when performing the depth value test, if the depth value is not stored in the buffer, reading data from the external memory. If the pixel flag bits of the pixels contained in a pixel block are all the first value, decompressing the pixel block and returning data of 64B or 32B according to a number of bits of the pixel block, expanding the data into 256B or 128B to store the data in the buffer, and setting the pixel flag of the pixel block as the first value. If the pixel flag bits of the pixels contained in a pixel block are not all the first value, decompressing the pixel block, returning data of 256B or 128B according to the number of the bits of the pixel block, and setting the pixel flag of the pixel block as the second value.

After the depth value data is returned to the buffer, it is read and enters the post-stage pipeline for depth value comparison. The depth value and the pixel flag bit of the pixel are updated according to the comparison result. The updated depth value is written back to the buffer. If the pixel flag bits of all pixels of the pixel block are the first value, updating the pixel flag of the pixel block with the pixel flag bit of the pixel. That is, the pixel flag of the pixel block is set as the first value. When a buffer line is replaced, the storage access control unit checks the pixel flag of the pixel block. If the pixel flag of the pixel block is the first value, data of 64B or 32B is read for compression and written to the external memory. If the pixel flag of the pixel block is the second value, data of 256B or 128B is read for compression and written to the external memory.

In an embodiment of the present disclosure, after performing the depth value test on the pixel, the method further includes: performing color calculation on the pixel, and performing programmable coloring processing on the pixel. The color calculation is the calculation on the pixel color, and the programmable coloring processing on the pixel is the coloring processing on the pixel.

In an embodiment of the present disclosure, after performing color calculation on the pixel and performing programmable coloring processing on the pixel, the method further includes: performing texture mapping before performing final color processing on the pixel. The data is sent to the texture mapping unit for processing. When the texture mapping is performed, if the access control unit is required to read data from the outside, the access control unit is first required to check the state of the pixel block corresponding to the data to be read. If the pixel flag of the pixel block is the first value, the storage access unit decompresses the pixel block and returns data of 64B or 32B to the texture mapping unit according to the number of bits per pixel. The texture processing unit expands the data into 256B or 128B for storing in the buffer and eventually writing into an external memory. If the pixel flag of the pixel block is the second value, the storage access unit decompresses the pixel block and returns data of 256B or 128B to the texture mapping unit according to the number of bits per pixel.

Operation 13: performing final color processing on the pixel, determining whether the four sampling points are all covered by the triangle. If the four sampling points are covered by the triangle, copying a color of the pixel center point to the four sampling points. If not all of the four sampling points are covered by the triangle, mixing colors of the four sampling points of the pixel.

In an embodiment of the present disclosure, after performing programmable coloring processing on the pixel, and before performing final color processing on the pixel, the method further includes: performing the depth value test on the pixel, determining whether the four sampling points are covered by the triangle. If the four sampling points are all covered by the triangle, comparing center depth values of the pixel according to a first preset rule, and replacing the depth values of the four sampling points with the compared center depth values. If not all of the four sampling points are covered by the triangle, comparing the depth value of each sampling point according to a second preset rule, storing the depth values of the compared four sampling points to a buffer, and finally writing to an external memory. When performing the depth value test, if the depth value is not stored in the buffer, reading data from the external memory. If the pixel flag bits of the pixels contained in a pixel block are the first value, decompressing the pixel block and returning data of 64B or 32B according to a number of bits of the pixel block, expanding the data into 256B or 128B to store the data to the buffer, and setting the pixel flag of the pixel block as the first value. If not all of the pixel flag bits of the pixels contained in a pixel block are the first value, decompressing the pixel block, returning data of 256B or 128B according to the number of the bits of the pixel block, and setting the double pixel flag of the pixel block as the second value.

After the depth value data is returned to the buffer and it will be read into the subsequent pipeline for depth value comparison. The depth value and the pixel flag bit of the pixel are updated according to the comparison result. The updated depth value is written back to the buffer. If the pixel flag bits of pixels in the pixel block are the first value, updating the pixel flag of the pixel block with the pixel flag bit of the pixel. That is, the pixel flag of the pixel block is the first value. When a buffer line is replaced, the memory access control unit checks the pixel flag of the pixel block. If the pixel flag of the pixel block is the first value, data of 64B or 32B is read for compression and written to the external memory. If the pixel flag of the pixel block is the second value, data of 256B or 128B is read for compression and written to the external memory.

In an embodiment of the present disclosure, the final color processing of the pixel includes determining whether it is necessary to read the color value of the target pixel. If necessary, sending a read request of the color value of the pixel to the buffer, if the color value is already in the buffer, sending the color value to the pipeline for color mixing operation; otherwise, sending a read request for the color value of 256B or 128B to the storage access control unit. The storage access control unit first checks whether the pixel flag bit of the pixel block which includes the pixel is the first value. If the pixel flag bit of the pixel block which includes this pixel is the first value, the storage access unit decompresses the pixel block and returns data of 64B or 32B to the pixel processing unit according to the number of bits per pixel. The pixel processing unit expands the data to 256B or 128B, stores the data to the buffer, and sets the pixel flag of the pixel block as the first value. If not all the double pixel flag bits of the pixels contained in a pixel block are the first value, decompressing the pixel block, returning data of 256B or 128B according to the number of the bits of the pixel block, and setting the pixel flag of the pixel block as the second value. After the data is returned to the buffer, it is read and enters the post-stage pipeline for color mixing. The post-stage pipeline performs final color processing on the pixel by determining whether the four sampling points are all covered by the triangle is determined. If the four sampling points are all covered by the triangle, the color of the pixel center point is copied to the four sampling points. If not all the four sampling points are covered by the triangle, colors of the four sampling points of the pixel are mixed. Alternatively, the post-stage pipeline performs final color processing on the pixel by determining the value of the pixel flag bit of the pixel. If it is the first value, the color of the pixel center point is copied to the four sampling points. If it is the second value, a color mixing process is performed on the four sampling points of the pixel. The pixel is written back to the buffer after the color processing. When a buffer line is replaced, the storage access control unit checks pixel flag value of the buffer line. If it is the first value, data of 64B or 32B is read for compression and stored to the external memory. If it is the second value, data of 256B or 128B is read for compression and stored to the external memory.

In an embodiment of the present disclosure, the method further includes: converting data into a format corresponding to a display and transmitting to an external memory. Since the arrangement format of internal data is different from the linear format that the display can display. Therefore, the display format conversion unit needs to re-read and convert the processed data into a format corresponding to the display and store it to the external memory. The display format conversion unit transmits a 256B or 128B read request to the storage access control unit. The storage access control unit first checks the pixel flag of the corresponding pixel block. If the pixel flag of the pixel block is the first value, the storage access unit decompresses the pixel block and returns data of 64B or 32B to the display format conversion unit according to the number of bits per pixel, and the display format conversion unit expands the data into 256B or 128B to write to the buffer. Otherwise, after decompressing the pixel block, the storage access unit will return data of 256B or 128B to the display format conversion unit. In an embodiment of the present disclosure, the pixel blocks corresponding to the data of 256B are 8×8 32 bpp, 16×8 16 bpp, 8×16 16 bpp, 16×16 8 bpp, and 8×4 64 bpp. The pixel blocks corresponding to the data of 128B are 8×4 32 bpp, 4×8 32 bpp, 8×8 16 bpp, 8×16 8 bpp, 16×8 8 bpp, and 4×4 64 bpp.

As shown in FIG. 2, in an embodiment, the edge anti-aliasing graphic processing system of the present disclosure includes a depth calculation module 21, a depth value test module 22 and a pixel processing module 23.

The depth calculation module 21 is configured to obtain four sampling points by double sampling a pixel horizontally and vertically and performing rasterization to the pixel. Then it is determined whether the four sampling points are all covered by a triangle. If the four sampling points are all covered by the triangle, calculating a depth value of a pixel center point, copying the depth value of the pixel center point to the four sampling points, and setting a pixel flag bit of the pixel as a first value; If not all the four sampling points are covered by the triangle, calculating depth values of the four sampling points, and setting a pixel flag bit of the pixel as a second value.

The depth value test module 22 is configured to perform a depth value test on the pixel, and determine whether the four sampling points of the pixel are all covered by the triangle. If the four sampling points are all covered by the triangle, comparing center depth values of the pixel according to a first preset rule, and replacing the depth values of the four sampling points with the compared center depth values. If not all the four sampling points are covered by the triangle, comparing the depth value of each sampling point according to a second preset rule, storing the depth values of the compared four sampling points to a buffer, and finally writing to an external memory.

The pixel processing module 23 is configured to perform final color processing on the pixel by determining whether the four sampling points are covered by the triangle. If the four sampling points are all covered by the triangle, copying a color of the pixel center point to the four sampling points. If not all the four sampling points are covered by the triangle, mixing colors of the four sampling points of the pixel.

As shown in FIG. 3, in an embodiment, the edge anti-aliasing graphic processing system of the present disclosure further includes: a color calculation module 24, a programmable coloring processing module 25, a display format conversion module 26, and storage access control module 27.

The color calculation module 24 is configured to perform color calculation on the pixel.

The programmable coloring processing module 25 is configured to perform coloring processing on the pixel.

The display format conversion module 26 is configured to convert data into a format corresponding to the display and transmit it to the external memory.

The storage access control module 27 is configured to receive read commands of each module and read and transfer data to the external memory.

Other module functions are the same as those of the previous embodiment and will not be described herein.

Figure 4:
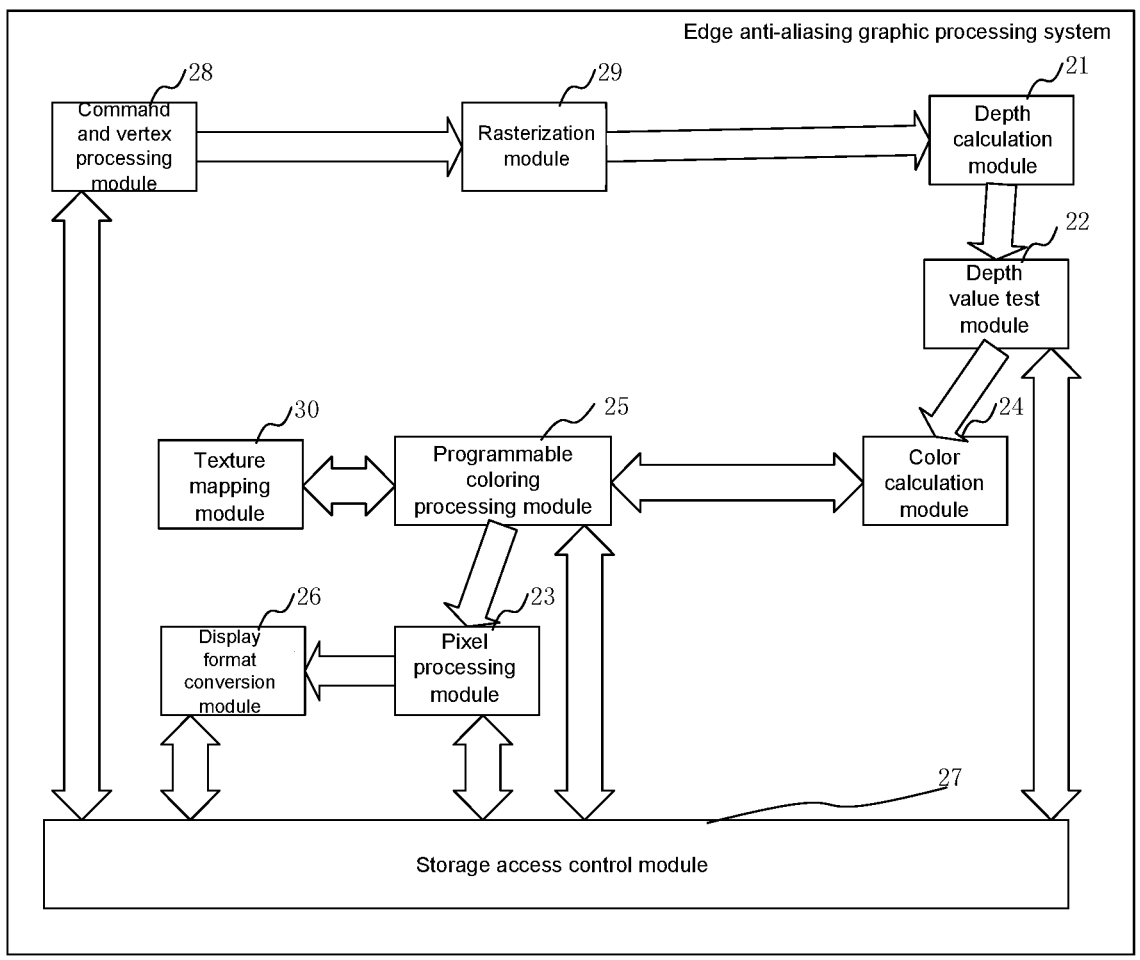
FIG. 4 is a schematic view showing the edge anti-aliasing graphic processing system according to a third embodiment of the present disclosure.

As shown in FIG. 4, in an embodiment, in addition to the depth calculation module 21, the depth value test module 22, the pixel processing module 23, the color calculation module 24, the programmable coloring processing module 25, the display format conversion module 26, and the storage access control module 27, the edge anti-aliasing graphic processing system of the present disclosure further includes: a command and vertex processing module 28, a rasterization module 29, and a texture mapping module 30.

The command and vertex processing module 28 is configured to start graphic processing command for the edge anti-aliasing and read the vertex information of the triangle.

The rasterization module 29 is configured to obtain four sampling points by double sampling a pixel horizontally and vertically and performing rasterization to the pixel.

The texture mapping module 30 is configured to perform texture mapping to the data.

Other module functions are the same as those of the previous embodiment and will not be described herein.

It should be noted that the division of each module of the above system is only a division of logical functions. In actual implementation, the modules may be integrated into one physical entity in whole or in part, or may be physically separated. These modules may all be implemented in the form of processing component calling by software. They may also be implemented entirely in hardware. It is also possible that some modules are implemented in the form of processing component calling by software, and some modules are implemented in the form of hardware. For example, the x module may be a separate processing element, or may be integrated in a chip of the above-mentioned apparatus, or may be stored in the memory of the above apparatus in the form of program code. The function of the above x module is called and executed by one of the processing elements of the above apparatus. The implementation of other modules is similar. In addition, all or part of these modules may be integrated or implemented independently. The processing elements described herein may be an integrated circuit with signal processing capabilities. In the implementation process, each operation of the above method or each of the above modules may be completed by an integrated logic circuit of hardware in the processor element or an instruction in a form of software.

For example, the above modules may be one or more integrated circuits configured to implement the above method, such as one or more Application Specific Integrated Circuits (ASICs), or one or more Digital Singnal Processors (DSPs), or one or more Field Programmable Gate Arrays (FPGAs). As another example, when one of the above modules is implemented in the form of calling program codes of a processing component, the processing component may be a general processor, such as a Central Processing Unit (CPU) or other processors that may call program codes. As another example, these modules may be integrated and implemented in the form of a system-on-a-chip (SOC).

In an embodiment of the present disclosure, the present disclosure further provides a computer readable storage medium, which stores a computer program, the program is executed by a processor to implement any of the above edge anti-aliasing graphic processing methods.

Those of ordinary skill will understand that all or part of the operations to implement the various method embodiments described above may be accomplished by hardware associated with a computer program. The computer program may be stored in a computer readable storage medium. The program, when executed, performs the operations including the above method embodiments. The foregoing storage medium includes various medium that may store program codes, such as a ROM, a RAM, a magnetic disk, or an optical disk.

Figure 5:
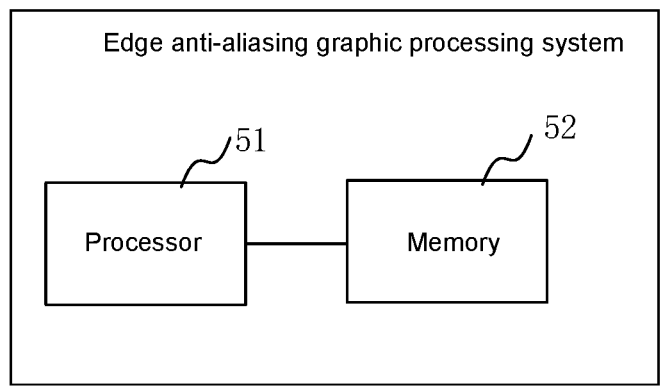
FIG. 5 is a schematic view showing an edge anti-aliasing graphic processing apparatus according to an embodiment of the present disclosure.

As shown in FIG. 5, in an embodiment, the edge anti-aliasing graphic processing apparatus of the present disclosure includes: a processor 51 and a memory 52. The memory 52 is configured to store a computer program. The processor 51 is coupled with the memory 52, for executing the computer program stored by the memory 52, to cause the edge anti-aliasing graphic processing apparatus to perform any one of the above edge anti-aliasing graphic processing methods.

Specifically, the memory 52 includes various medium that may store program codes, such as a ROM, a RAM, a magnetic disk, a USB flash disk, a memory card, or an optical disk.

Preferably, the processor 51 may be a general processor, including a Central Processing Unit (CPU), a Network Processor (NP), and the like. It may also be a Digital Signal Processor (DSP), an Application Specific Integrated Circuit (ASIC), a Field Programmable Gate Array, or other programmable logic apparatuses, discrete gate or transistor logic apparatuses, discrete hardware components.

In summary, the edge anti-aliasing graphic processing method, system, storage medium and apparatus of the present disclosure save the bandwidth of the graphic processing to read the externally stored data. For most of the pixels, calculation and test of the depth value, and processing of the attributes such as color are required only for once, which greatly reduces the amount of data that needs to be processed. Therefore, the present disclosure effectively overcomes various shortcomings and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. An edge anti-aliasing graphic processing method, comprising:
    obtaining four sampling points by double sampling a pixel horizontally and vertically and performing rasterization to the pixel, determining whether the four sampling points are covered by a triangle,
    if the four sampling points are all covered by the triangle, calculating a depth value of a pixel center point, copying the depth value of the pixel center point to the four sampling points, and setting a pixel flag bit of the pixel as a first value,
    if not all the four sampling points are covered by the triangle, calculating depth values of the four sampling points, and setting a pixel flag bit of the pixel as a second value;
    performing a depth value test on the pixel, and determining whether the four sampling points of the pixel are all covered by the triangle,
    if the four sampling points are all covered by the triangle, comparing center depth values of the pixel according to a first preset rule, and replacing the depth values of the four sampling points with the compared center depth values,
    if not all the four sampling points are covered by the triangle, comparing the depth value of each sampling point according to a second preset rule, storing the depth values of the compared four sampling points to a buffer, and finally writing to an external memory; and
    performing final color processing on the pixel, determining whether the four sampling points are all covered by the triangle,
    if the four sampling points are all covered by the triangle, copying a color of the pixel center point to the four sampling points,
    if not all the four sampling points are covered by the triangle, mixing colors of the four sampling points of the pixel.

2. The edge anti-aliasing graphic processing method according to claim 1, wherein after performing the depth value test on the pixel, the method further comprises: performing color calculation on the pixel, and performing programmable coloring processing on the pixel.

3. The edge anti-aliasing graphic processing method according to claim 1, further comprising: converting data into a format corresponding to a display and transmitting to an external memory.

4. The edge anti-aliasing graphic processing method according to claim 1, wherein before performing final color processing on the pixel, the method further comprises: performing texture mapping.

5. The edge anti-aliasing graphic processing method according to claim 1, wherein before performing final color processing on the pixel, the method further comprises:
    performing the depth value test on the pixel, determining whether the four sampling points are covered by the triangle,
    if the four sampling points are all covered by the triangle, comparing center depth values of the pixel according to a first preset rule, and replacing the depth values of the four sampling points with the compared center depth values,
    if not all the four sampling points are covered by the triangle, comparing the depth value of each sampling point according to a second preset rule, storing the depth values of the compared four sampling points to a buffer, and finally writing to an external memory.

6. The edge anti-aliasing graphic processing method according to claim 1, wherein when performing the depth value test,
    if the depth value is not stored in the buffer, reading data from the external memory,
    if a pixel flag bit of a pixel block which includes the pixel is the first value, decompressing the pixel block and returning data of 64B or 32B according to a number of bits of the pixel block, and expanding the data into 256B or 128B to store the data to the buffer, if the pixel flag bit of the pixel block is not the first value, decompressing the pixel block and returning data of 256B or 128B according to the number of the bits of the pixel block.

7. The edge anti-aliasing graphic processing method according to claim 6, wherein a state of the pixel block is represented by a hexadecimal digit;

0 represents that compression of 4 times sample pixel fails;

1 represents a clear value of the 4 times sample pixel;

2, 4, 6, 8, 0xA, 0xC, and 0xE represent 7 compression results of the 4 times sample pixel;

3 represents a compression result of a double pixel of 32B;

5 represents that compression of the pixel fails; and

0xF represents a clear value of the pixel.

8. An edge anti-aliasing graphic processing system, comprising: a depth calculation module, a depth value test module, and a pixel processing module;

wherein the depth calculation module is configured to obtain four sampling points by double sampling a pixel horizontally and vertically and performing rasterization to the pixel, and determine whether the four sampling points are covered by a triangle, if the four sampling points are all covered by the triangle, calculating a depth value of a pixel center point, copying the depth value of the pixel center point to the four sampling points, and setting a pixel flag bit of the pixel as a first value, if not all the four sampling points are covered by the triangle, calculating depth values of the four sampling points, and setting a pixel flag bit of the pixel as a second value;

the depth value test module is configured to perform a depth value test on the pixel, and determine whether the four sampling points of the pixel are all covered by the triangle, if the four sampling points are covered by the triangle, comparing center depth values of the pixel according to a first preset rule, and replacing the depth values of the four sampling points with the compared center depth values, if not all the four sampling points are covered by the triangle, comparing the depth value of each sampling point according to a second preset rule, storing the depth values of the compared four sampling points to a buffer; and the pixel processing module is configured to perform final color processing on the pixel, and determine whether the four sampling points are covered by the triangle, if the four sampling points are all covered by the triangle, copying a color of the pixel center point to the four sampling points, if not all the four sampling points are covered by the triangle, mixing colors of the four sampling points of the pixel.

9. The edge anti-aliasing graphic processing system according to claim 8, further comprising: a color calculation module, a programmable coloring processing module, a display format conversion module, and a storage access control module;

wherein the color calculation module is configured to perform color calculation on the pixel;

the programmable coloring processing module is configured to perform programmable coloring processing on the pixel;

the display format conversion module is configured to convert data into a format corresponding to a display;

the storage access control module is configured to cache the depth value and finally store to an external memory.

10. A non-transitory computer readable storage medium, storing a computer program, wherein the computer program is executed by a processor to implement the edge anti-aliasing graphic processing method according to claim 1.

11. An edge anti-aliasing graphic processing apparatus, comprising: a processor and a memory;

the memory is configured to store a computer program;

the processor is coupled with the memory, for executing the computer program stored by the memory, to cause the edge anti-aliasing graphic processing apparatus to perform an edge anti-aliasing graphic processing method, wherein the method comprises:

obtaining four sampling points by double sampling a pixel horizontally and vertically and performing rasterization to the pixel, determining whether the four sampling points are covered by a triangle, if the four sampling points are all covered by the triangle, calculating a depth value of a pixel center point, copying the depth value of the pixel center point to the four sampling points, and setting a pixel flag bit of the pixel as a first value, if not all the four sampling points are covered by the triangle, calculating depth values of the four sampling points, and setting a pixel flag bit of the pixel as a second value;

performing a depth value test on the pixel, and determining whether the four sampling points of the pixel are all covered by the triangle, if the four sampling points are all covered by the triangle, comparing center depth values of the pixel according to a first preset rule, and replacing the depth values of the four sampling points with the compared center depth values, if not all the four sampling points are covered by the triangle, comparing the depth value of each sampling point according to a second preset rule, storing the depth values of the compared four sampling points to a buffer, and finally writing to an external memory; and performing final color processing on the pixel, determining whether the four sampling points are all covered by the triangle, if the four sampling points are all covered by the triangle, copying a color of the pixel center point to the four sampling points, if not all the four sampling points are covered by the triangle, mixing colors of the four sampling points of the pixel.

\* \* \* \* \*